US008835071B2

(12) United States Patent
Imamura et al.

(10) Patent No.: US 8,835,071 B2
(45) Date of Patent: Sep. 16, 2014

(54) FUEL CELL SYSTEM INCLUDING OXIDATION GAS SUPPLY PIPE INTEGRATED WITH COOLANT SUPPLY PIPE

(75) Inventors: Atsushi Imamura, Kariya (JP); Hiroshi Koide, Ichinomiya (JP); Yasunari Arai, Takahama (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 216 days.

(21) Appl. No.: 12/892,026

(22) Filed: Sep. 28, 2010

(65) Prior Publication Data
US 2011/0091784 A1    Apr. 21, 2011

(30) Foreign Application Priority Data
Oct. 16, 2009 (JP) .................. 2009-239526

(51) Int. Cl.
*H01M 8/02* (2006.01)
*H01M 8/04* (2006.01)
*H01M 8/06* (2006.01)
*H01M 8/24* (2006.01)

(52) U.S. Cl.
CPC ............ *H01M 8/04201* (2013.01); *Y02E 60/50* (2013.01)
USPC ............ 429/458; 429/411; 429/434; 429/513

(58) Field of Classification Search
USPC ................... 429/434, 411, 458, 513
See application file for complete search history.

(56) References Cited

U.S. PATENT DOCUMENTS

| 6,541,148 B1* | 4/2003 | Walsh et al. .................. 429/434 |
| 2004/0151958 A1 | 8/2004 | Formanski et al. |
| 2005/0106446 A1 | 5/2005 | Sato et al. |
| 2010/0028740 A1 | 2/2010 | Kume et al. |
| 2010/0068600 A1 | 3/2010 | Sato et al. |

FOREIGN PATENT DOCUMENTS

| CN | 2566087 | 8/2003 |
| CN | 1745494 | 3/2006 |
| DE | 102004047944 | 6/2005 |
| JP | 6-31695 | 2/1994 |
| JP | 8-321316 | 12/1996 |
| JP | 11-54140 | 2/1999 |
| JP | 2004-60975 | 2/2004 |
| JP | 2005-079006 | 3/2005 |

(Continued)

OTHER PUBLICATIONS

Jufuku, Y., Machine translation of JP 2008-277039 A, Nov. 2008.*

(Continued)

*Primary Examiner* — Sean P Cullen
(74) *Attorney, Agent, or Firm* — Greenblum & Bernstein P.L.C.

(57) ABSTRACT

An end plate is joined to a fuel cell stack. A first piping unit and a second piping unit are attached to the end plate. The first piping unit has a first attachment base, to which a fuel gas supply pipe, a first oxidation off-gas discharge pipe, and a coolant discharge pipe are coupled. The second piping unit has a second attachment base, to which an oxidation gas supply pipe, a coolant supply pipe, and a discharge pipe are coupled. The discharge pipe is joined to a discharge cylinder coupled to the first oxidation off-gas discharge pipe. The oxidation gas supply pipe and the coolant supply pipe are integrated with each other. Also, the first oxidation off-gas discharge pipe and the coolant discharge pipe are integrated with each other.

6 Claims, 8 Drawing Sheets

(56) References Cited

FOREIGN PATENT DOCUMENTS

| JP | 2005-108698 | 4/2005 |
| JP | 2005-310464 | 11/2005 |
| JP | 2005-332674 | 12/2005 |
| JP | 2008-177100 | 7/2008 |
| JP | 2008-277039 | 11/2008 |
| JP | 2009-206067 | 9/2009 |
| WO | WO 9620509 A1 * | 7/1996 |
| WO | WO 2008087542 A1 * | 7/2008 |

OTHER PUBLICATIONS

China Office action, dated Dec. 28, 2012 along with an english translation thereof.
Japan Office action, mail date is Aug. 6, 2013.
Japan Office action, mail date is Dec. 3, 2013.

* cited by examiner

US 8,835,071 B2

FUEL CELL SYSTEM INCLUDING OXIDATION GAS SUPPLY PIPE INTEGRATED WITH COOLANT SUPPLY PIPE

BACKGROUND OF THE INVENTION

The present invention relates to a fuel cell system, and more specifically, to a fuel cell system that improves power generation efficiency and reduces weight and size.

As environment-friendly electric automobiles, automobiles having polymer electrolyte fuel cell systems have been developed. A fuel cell system employs a fuel cell formed by laminating power generation cells. Each power generation cell includes a hydrogen ion conductive solid polymer electrolyte membrane. A carbon anode supporting a platinum catalyst is laminated on one side of the solid polymer electrolyte membrane, and a carbon cathode supporting a platinum catalyst is laminated on the other side. A gas passage forming member is laminated on the surface of each of the carbon electrodes. The gas passage forming member forms a gas passage for supplying reaction gas to the carbon electrode. The gas passage forming member is formed of a metal lath. A flat plate shaped separator is laminated on the surface of each gas passage forming member.

Hydrogen gas as fuel gas is supplied to the anode. Air (oxygen gas) as oxidation gas is supplied to the cathode. At the anode, the hydrogen gas is ionized. Hydrogen ions permeate the solid polymer electrolyte membrane to move to the cathode. The hydrogen ions react with oxygen at the cathode, generating water. Some of the generated water moves from the cathode and permeates the solid polymer electrolyte membrane, and then flows into the anode. Electrons at the anode move to the cathode through an external load. The series of these electrochemical reactions extracts electric energy.

Japanese Laid-Open Patent Publication No. 2005-332674 discloses one type of the above described fuel cell. This fuel cell has a fuel cell stack accommodated in a stack case. The fuel cell stack has cell modules with both ends supported by end plates. One of the end plates has a terminal, from which a high voltage is supplied to an electric motor. The other end plate is formed of an electrical insulation material. Pipes for supplying and discharging hydrogen gas, air, and coolant are independently connected to this end plate made of the electrical insulation material. These pipes require a large installation space, which hinders reduction in size and weight.

To solve the above present problems, Japanese Laid-Open Patent Publication No. 2008-177100 has proposed a fuel cell system. According to the publication, a fuel cell stack incorporates a plurality of manifolds. Inlets and outlets of the manifolds are formed on one side of the fuel cell stack. A resin piping member is attached to the fuel cell stack. The piping member has a plurality of fluid passages at parts that contact the cell stack. The fluid passages extend to positions that correspond to the inlets and outlets of the manifolds. The fluid passages include a hydrogen inlet passage, a hydrogen outlet passage, an air inlet passage, an air outlet passage, a coolant inlet passage, and a coolant outlet passage. With the piping member attached to one side of the fuel cell stack, each of the fluid passages is connected to the corresponding one of the inlets and outlets of the manifolds.

As described above, the piping member of the fuel cell system disclosed in Japanese Laid-Open Patent Publication No. 2008-177100 is a single unitized member, which simplifies the structure of the system. However, the piping member still has a plurality of independent pipes forming the fluid passages. Thus, it is impossible to cool air flowing through the air inlet passage using coolant flowing through the coolant inlet passage. The temperature of air supplied to the air inlet passage by a compressor therefore cannot be lowered, hindering the electrochemical reaction between hydrogen and oxygen. This prevents the power generation efficiency from being improved. Further, since the pipes are arranged at predetermined intervals, a relatively large space is required for each pipe, the weight and size of the pipes cannot be reduced.

SUMMARY OF THE INVENTION

Accordingly, it is an objective of the present invention to provide a fuel cell system that improves the power generation efficiency and reduces the installation space for the oxidation supply pipe and the coolant supply pipe, thereby reducing weight and size.

To achieve the foregoing objective and in accordance with one aspect of the present invention, a fuel cell system is provided that includes a fuel cell including a fuel electrode and the fuel electrode including an inlet and an outlet, a fuel gas supply pipe connected to the inlet of the fuel electrode of the fuel cell, a fuel off-gas pipe connected to the outlet of the fuel electrode, an oxidation gas supply pipe connectable to the inlet of the oxidant electrode, an oxidation off-gas pipe connectable to the outlet of the oxidant electrode, a cooling jacket in fuel cell, a coolant supply pipe, and a coolant discharge pipe. The cooling jacket includes an inlet and an outlet. The coolant supply pipe is connected to the inlet of the cooling jacket in the fuel cell. The coolant discharge pipe is connected to the outlet of the cooling jacket. The oxidation gas supply pipe has in it an oxidation gas passage, and the coolant supply pipe has in it a coolant supply passage. The oxidation gas supply pipe and the coolant supply pipe are integrated, and the oxidation gas passage and the coolant supply passage are separated from each other by a single partition wall.

DETAILED DESCRIPTION OF THE PREFERRED EMBODIMENTS

A fuel cell system for an automobile according to one embodiment of the present invention will now be described with reference to FIGS. 1 to 13.

Figure 1:
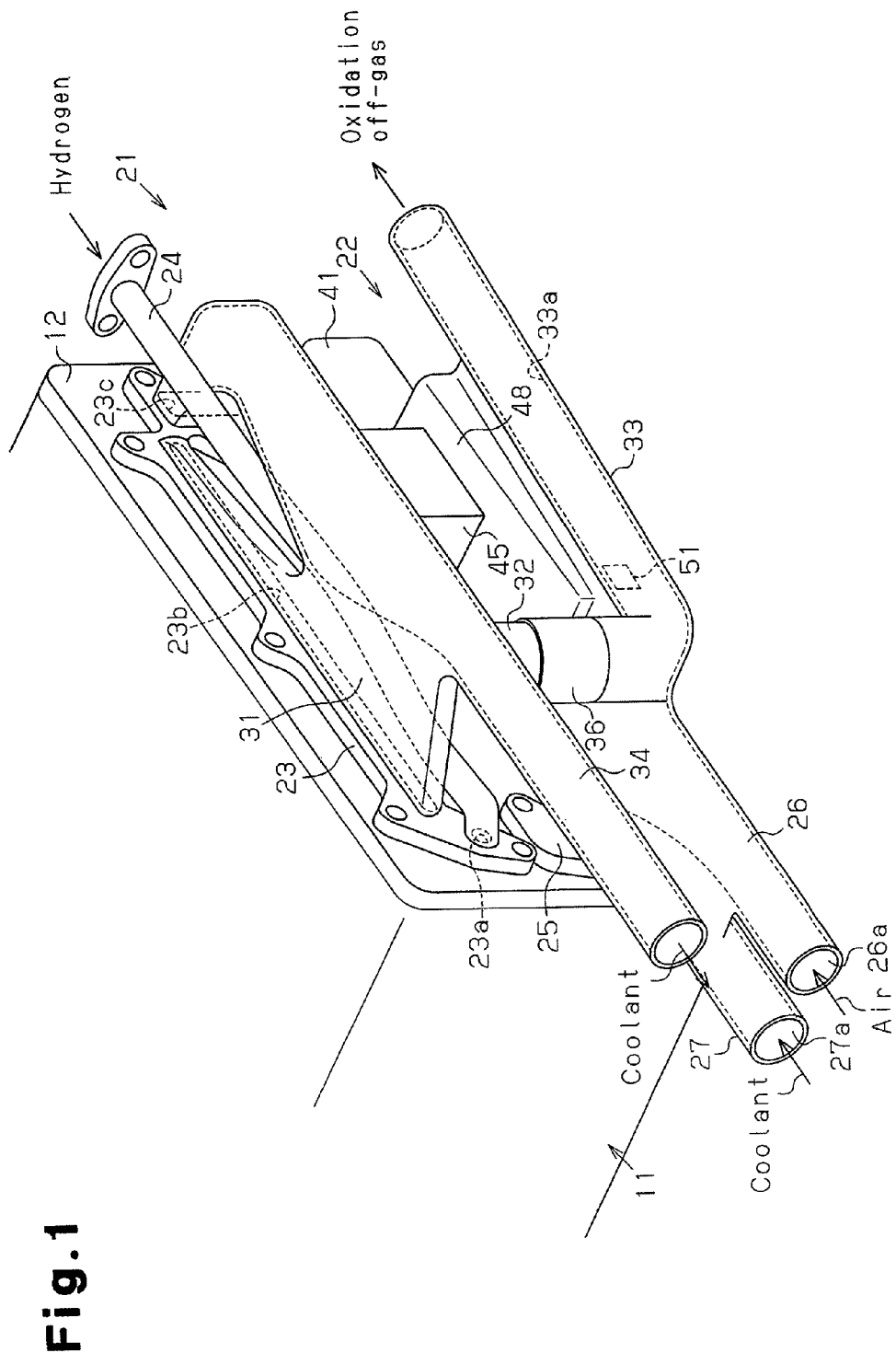
FIG. 1 is an enlarged perspective view illustrating a fuel cell system according to one embodiment of the present invention.

As shown in FIG. 1, the fuel cell system includes a fuel cell stack 11. The fuel cell stack 11 has laminated power generating cells (not shown). Hydrogen gas as fuel gas is supplied to the fuel electrode of each power generating cell. Air (oxygen gas) as oxidation gas is supplied to the oxidant electrode. As a result, through the electrochemical reactions between hydrogen gas and oxygen, electric energy is extracted and the water is generated.

Figure 2:
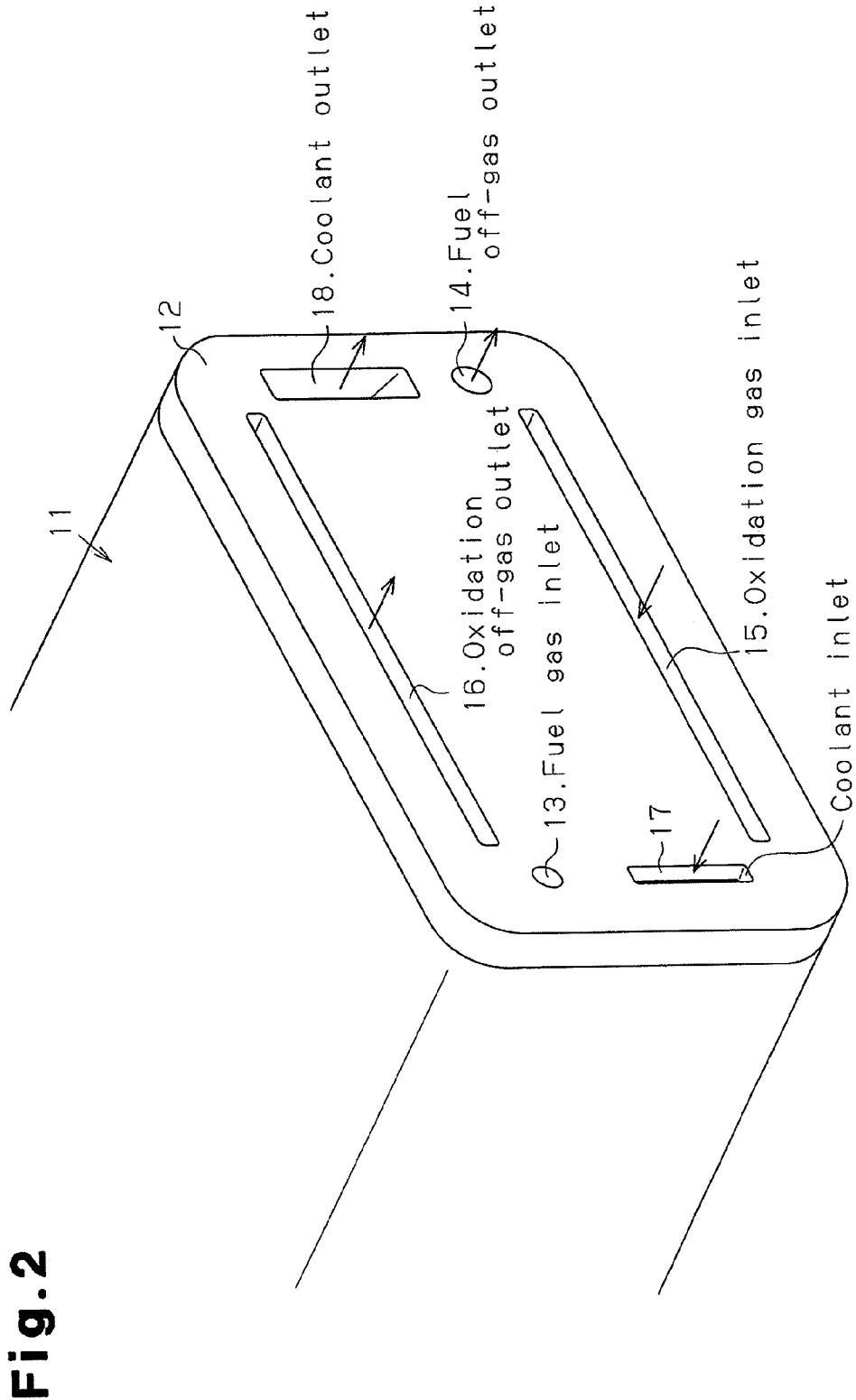
FIG. 2 is a perspective view of a fuel cell stack and an end plate.

As shown in FIG. 2, an end plate 12 made of an insulation material is fixed to an end face of the fuel cell stack 11 with bolts (not shown). A fuel gas inlet 13 is formed in a left upper part of the end plate 12. A fuel off-gas outlet 14 is formed in a right lower part of the end plate 12. A laterally extending oxidation gas inlet 15 is formed in a lower part of the end plate 12. A laterally extending oxidation off-gas outlet 16 is formed in an upper part of the end plate 12. As is shown in FIGS. 1 and 2, the fuel off-gas outlet 14, the oxidation gas inlet 15, the coolant inlet 17, and the fuel gas inlet 13 are sequentially positioned in a peripheral direction of the end plate. A coolant inlet 17 is formed in a left lower part of the end plate 12. The coolant inlet 17 communicates with a cooling jacket formed in the fuel cell stack 11. A coolant outlet 18 is formed in a right upper part of the end plate 12. As is illustrated in FIG. 2, the longitudinal axes of the coolant inlet 17 and coolant outlet 18 extend parallel to each other and are located at opposite sides of the end plate.

Figure 4:
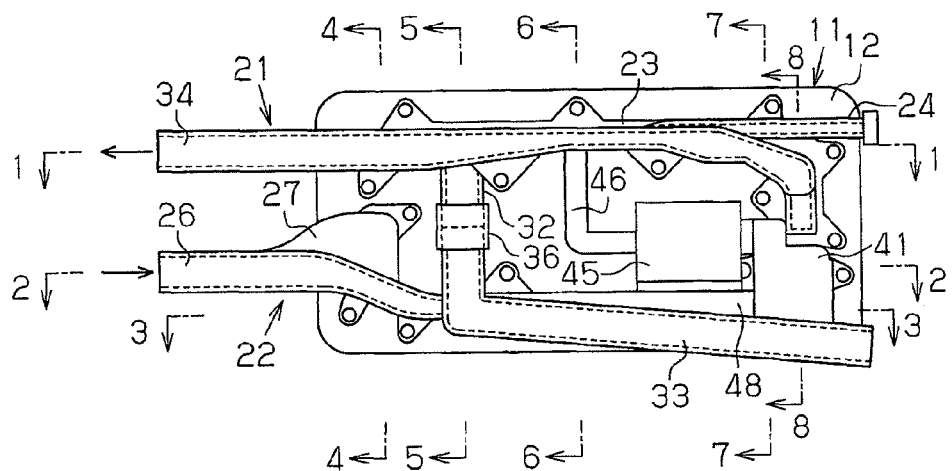
FIG. 4 is a front view of the first piping unit and the second piping unit.
Figure 5:
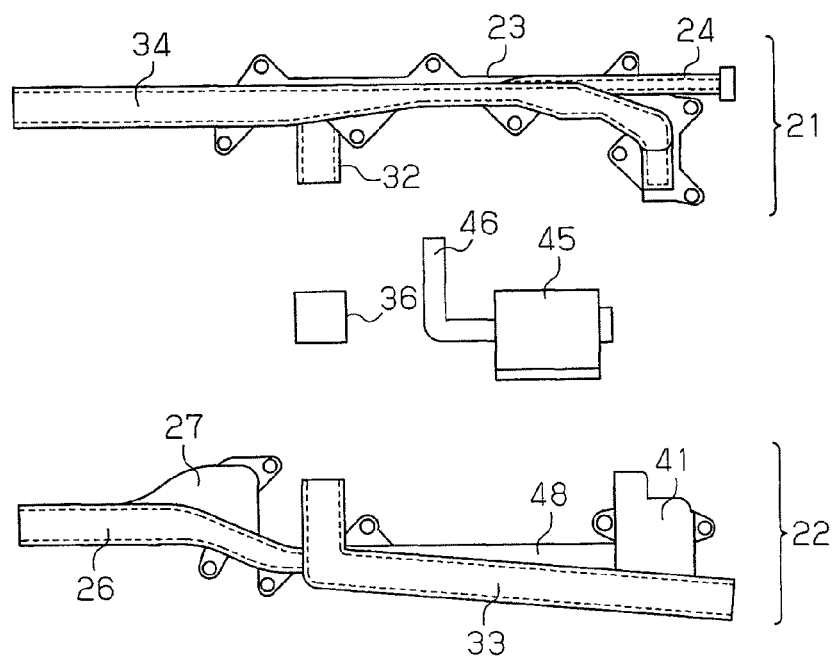
FIG. 5 is a front view of the first piping unit, the second piping unit, and a pump.

As shown in FIGS. 1 and 4, first and second piping units 21, 22 are detachably fixed to the end plate 12 with bolts (not shown). As shown in FIG. 5, the first and second piping units 21, 22 are separate bodies. The first piping unit 21 has a first attachment base 23, to which a fuel gas supply pipe 24, a first oxidation off-gas discharge pipe 31, and a coolant discharge pipe 34 are integrated. Most of the fuel gas supply pipe 24 is arranged to pass through between the end plate 12 and the coolant discharge pipe 34. The second piping unit 22 has a second attachment base 25, to which an oxidation gas supply pipe 26, a coolant supply pipe 27, a second oxidation off-gas discharge pipe 33, a hydrogen separator 41, and a diluter 48 are integrated. A joint 36 and a pump 45 are arranged between the first piping unit 21 and the second piping unit 22.

Figure 3:
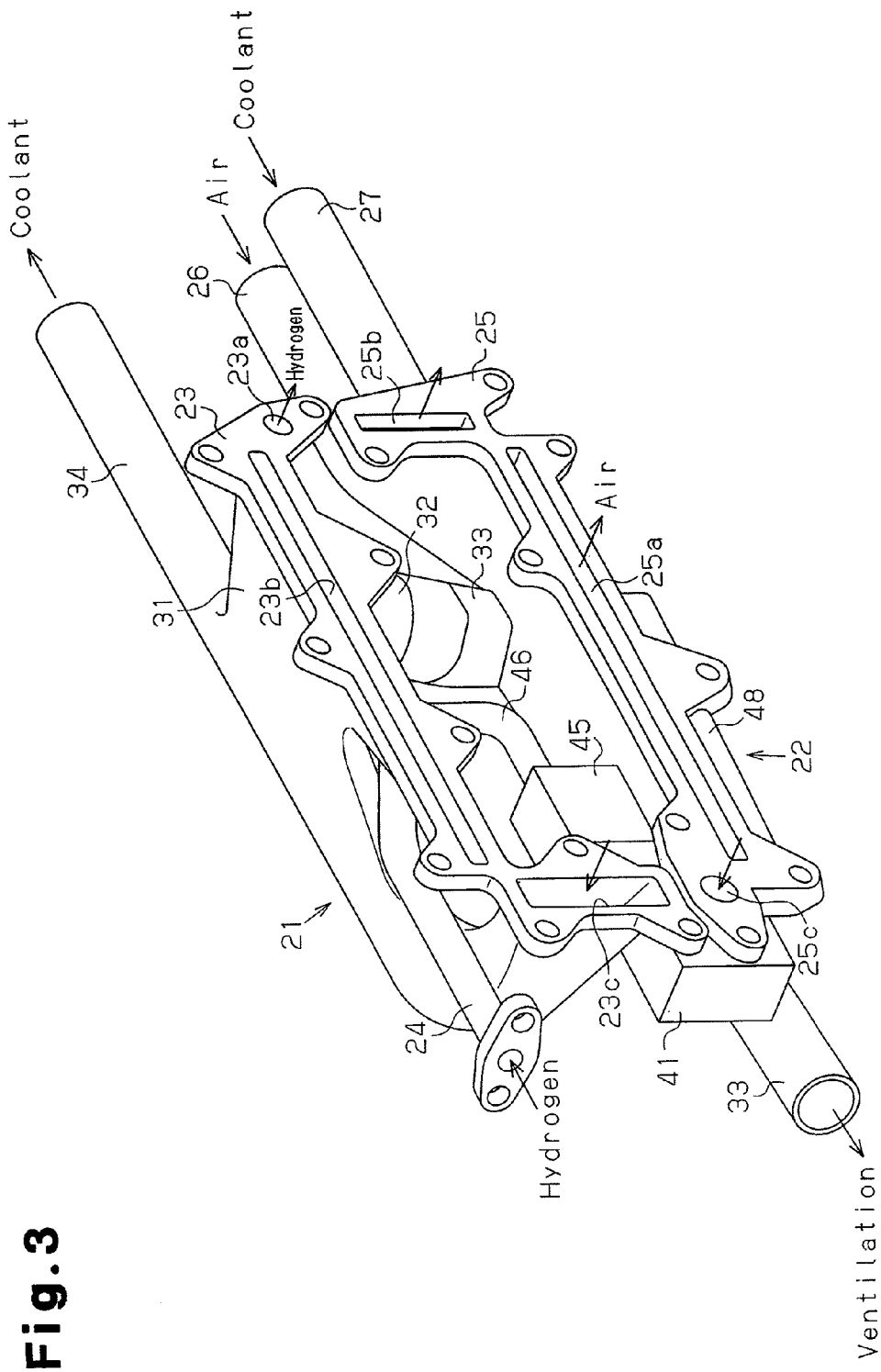
FIG. 3 is a perspective view of a first piping unit and a second piping unit seen from the back side.

As shown in FIG. 3, the first attachment base 23 has an inlet hole 23a communicating with the fuel gas inlet 13 of the end plate 12, an outlet hole 23b communicating with the oxidation off-gas outlet 16, and an outlet hole 23c communicating with the coolant outlet 18. As shown in FIG. 1, the distal end of the fuel gas supply pipe 24 is integrally coupled to the first attachment base 23 so as to communicate with the inlet hole 23a, that is, with the fuel gas inlet 13. Fuel gas is therefore supplied to the fuel electrodes in the fuel cell stack 11 through the fuel gas supply pipe 24.

Figure 6:
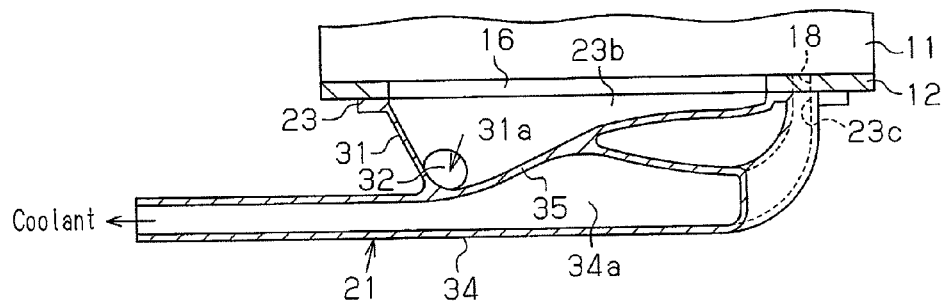
FIG. 6 is a cross-sectional view taken along line 1-1 of FIG. 4.
Figure 10:
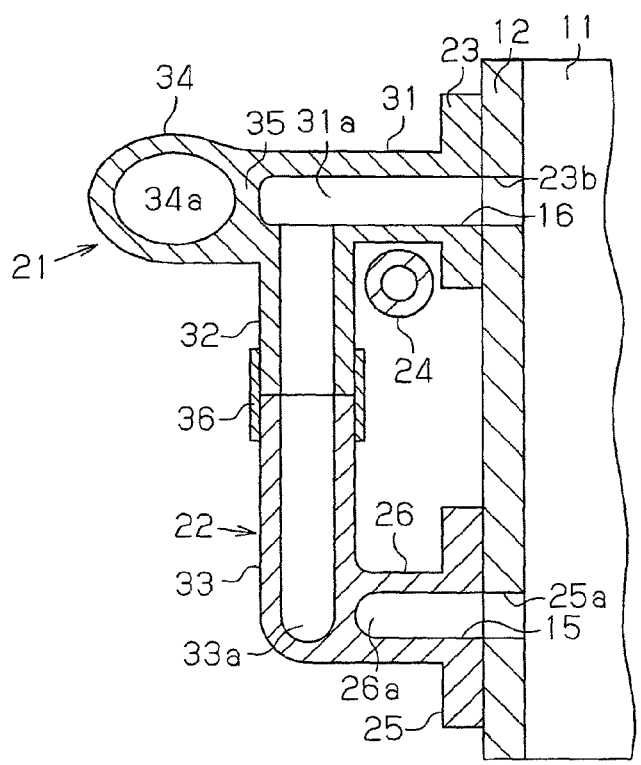
FIG. 10 is a cross-sectional view taken along line 5-5 of FIG. 4.
Figure 11:
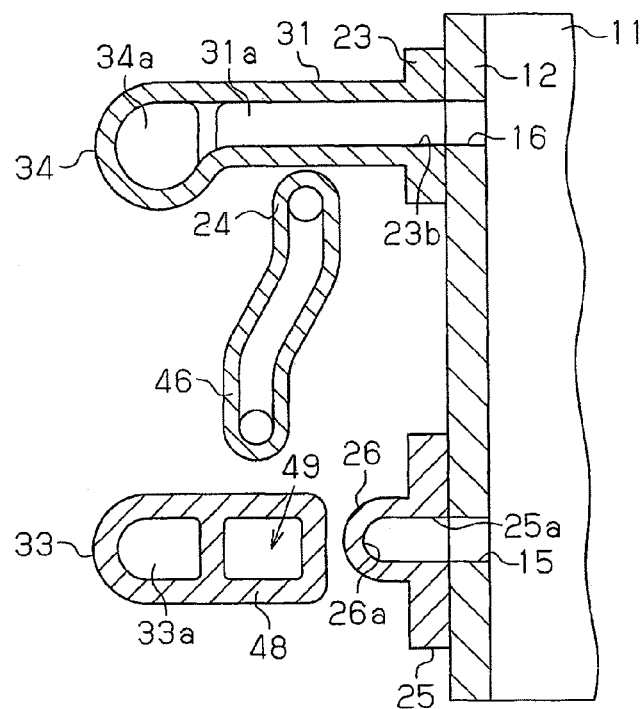
FIG. 11 is a cross-sectional view taken along line 6-6 of FIG. 4.

As shown in FIGS. 1, 3, and 6, the first oxidation off-gas discharge pipe 31, which is formed to have a flat shape, is integrally coupled to the first attachment base 23 so as to communicate with the outlet hole 23b, that is, the oxidation off-gas outlet 16. As shown in FIG. 10, a discharge cylinder 32 projects downward from the bottom wall of the first oxidation off-gas discharge pipe 31. The coolant discharge pipe 34 is integrally coupled to the first oxidation off-gas discharge pipe 31 so as to communicate with the outlet hole 23c of the first attachment base 23, that is, with the coolant outlet 18. An oxidation off-gas discharge passage 31a of the first oxidation off-gas discharge pipe 31 and a coolant discharge passage 34a of the coolant discharge pipe 34 are separated from each other by a single discharge pipe partition wall 35.

Figure 7:
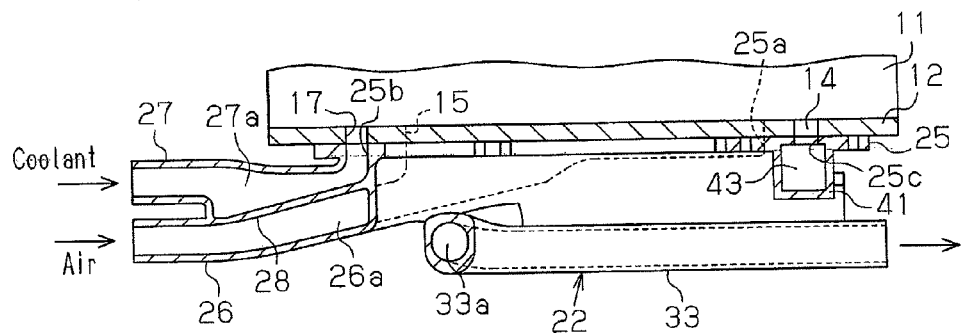
FIG. 7 is a cross-sectional view taken along line 2-2 of FIG. 4.
Figure 8:
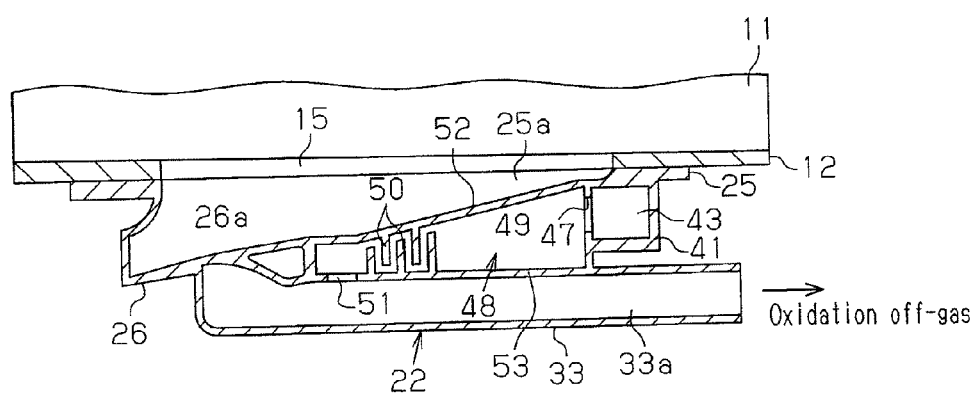
FIG. 8 is a cross-sectional view taken along line 3-3 of FIG. 4.
Figure 9:
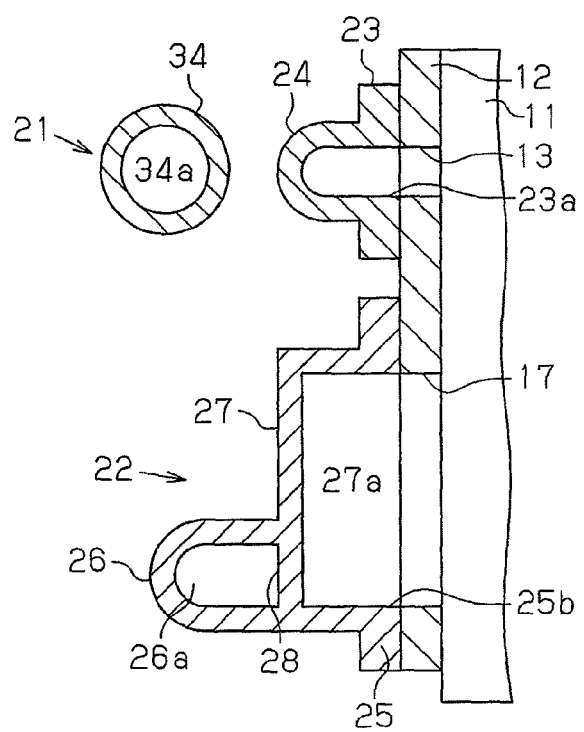
FIG. 9 is a cross-sectional view taken along line 4-4 of FIG. 4.

The second attachment base 25 has an inlet hole 25a communicating with the oxidation gas inlet 15 of the end plate 12, an inlet hole 25b communicating with the coolant inlet 17, and an outlet hole 25c communicating with the fuel off-gas outlet 14. As shown in FIGS. 7 and 8, the distal end of the oxidation gas supply pipe 26 is integrally coupled to the second attachment base 25 so as to communicate with the inlet hole 25a, that is, with the oxidation gas inlet 15. The distal end of the coolant supply pipe 27 is coupled to the second attachment base 25 so as to communicate with the inlet hole 25b, that is, with the coolant inlet 17. As shown in FIG. 7, the oxidation gas supply pipe 26 and the coolant supply pipe 27 are formed integrally. An oxidation gas supply passage 26a of the oxidation gas supply pipe 26 and a coolant supply passage 27a of the coolant supply pipe 27 are separated from each other by a single supply pipe partition wall 28.

As shown in FIGS. 1 and 8, the second oxidation off-gas discharge pipe 33 is coupled to the outer side surface of the oxidation gas supply pipe 26. As shown in FIG. 10, one end of the second oxidation off-gas discharge pipe 33 projects upward. The joint 36 couples the discharge cylinder 32 and the projecting ends of the second oxidation off-gas discharge pipe 33 to each other.

Figure 12:
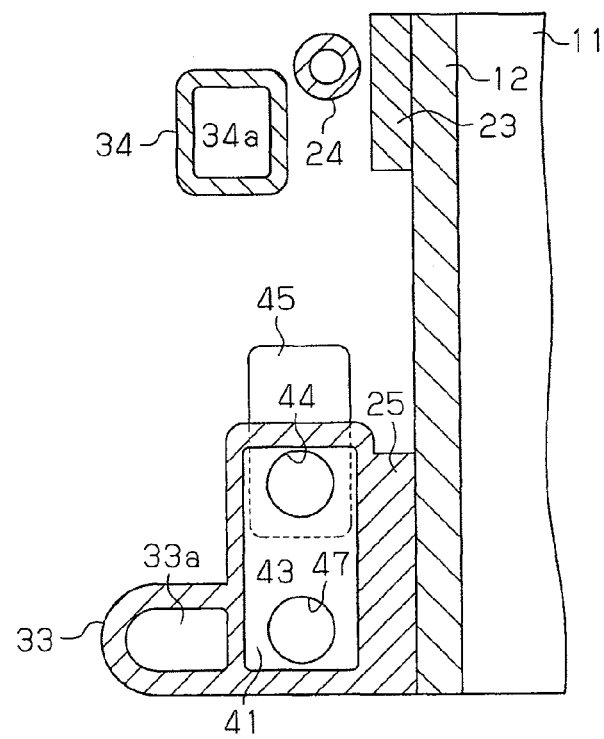
FIG. 12 is a cross-sectional view taken along line 7-7 of FIG. 4.

As shown in FIGS. 7 and 8, the hydrogen separator 41 is formed integrally with the second attachment base 25 to communicate with the outlet hole 25c, that is, with the fuel off-gas outlet 14. A separation chamber 43 is defined in the hydrogen separator 41. A structure for separating hydrogen from fuel off-gas (not shown) is provided in the separation chamber 43. As shown in FIG. 4, the pump 45 (see FIG. 5) is connected to a hydrogen gas outlet 44 of the separation chamber 43. The discharge port (not shown) of the pump 45 is connected to a middle part (see FIG. 11) of the fuel gas supply pipe 24 via a pipe 46. As shown in FIGS. 8 and 12, the diluter 48 is formed integrally with the hydrogen separator 41. The diluter 48 is arranged adjacent to a fuel off-gas outlet 47 of the separation chamber 43. The diluter 48 has a dilution chamber 49, in which a plurality of meandering plates 50 in which the plates are alternately arranged. The communication hole 51 is formed at the downstream side of the dilution chamber 49. The dilution chamber 49 communicates with the second oxidation off-gas discharge passage 33a of the second oxidation off-gas discharge pipe 33 through the communication hole 51.

As shown in FIG. 8, the oxidation gas supply pipe 26, the second oxidation off-gas discharge pipe 33, and the diluter 48 are formed integrally. The oxidation gas supply passage 26a of the oxidation gas supply pipe 26 and the dilution chamber 49 of the diluter 48 are separated from each other by a single partition wall 52. Also, the second oxidation off-gas discharge passage 33a and the dilution chamber 49 are separated from each other by a single passage partition wall 53. In the present embodiment, the hydrogen separator 41 and the diluter 48 function as a fuel off-gas pipe connected to the outlet hole 25c of the second attachment base 25 (the fuel off-gas outlet 14).

The first and second piping units 21, 22 are each preferably formed as an integral body except for the pump 45 and the pipe 46. Since it is difficult to integrally mold the fuel gas supply pipe 24, the fuel gas supply pipe 24 may be molded separately and then connected to the piping unit. In addition, the hydrogen separator 41 and the diluter 48 are molded separately, and coupled to the piping units.

The operation of the above described fuel cell system will now be described.

With reference to FIGS. 1 and 4, hydrogen gas is supplied to the supply pipe 24 from a hydrogen gas tank (not shown). The hydrogen gas is supplied to the anode-side fuel electrode of the fuel cell stack 11 through the inlet hole 23a of the first attachment base 23 and the fuel gas inlet 13 of the end plate 12. On the other hand, air is supplied to the oxidation gas supply passage 26a of the oxidation gas supply pipe 26 from a compressor (not shown). The air is supplied to the cathode-side oxidant electrode of the fuel cell stack 11 through the inlet hole 25a of the second attachment base 25 and the oxidation gas inlet 15 of the end plate 12. Further, coolant is supplied to the coolant supply passage 27a of the coolant supply pipe 27 by a pump (not shown). The coolant is supplied to the cooling jacket of the fuel cell stack 11 through the inlet hole 25b of the second attachment base 25 and the coolant inlet 17 of the end plate 12. In the fuel cell stack 11, the hydrogen gas supplied to the fuel electrode and the oxygen in the air supplied to the oxidant electrode are electro-chemically reacted with each other to generate electricity. The electricity is then supplied, for example, to a drive motor of the automobile through electrode terminals.

Figure 13:
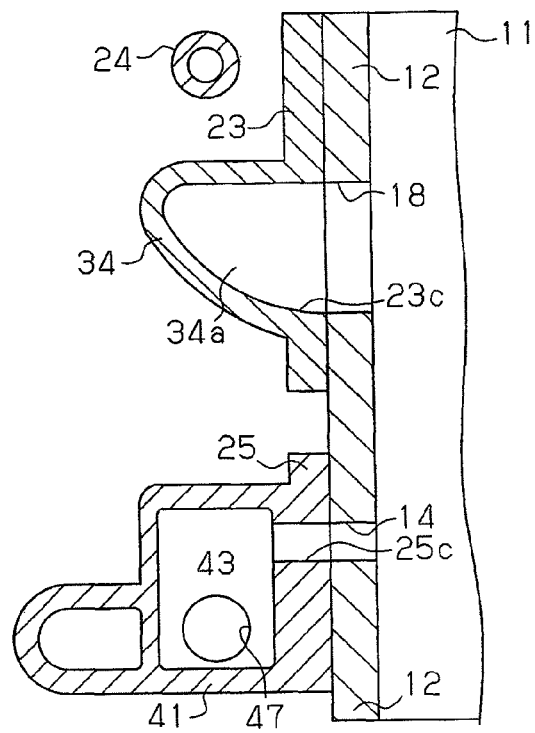
FIG. 13 is a cross-sectional view taken along line 8-8 of FIG. 4.

The hydrogen gas that has been used for generating electricity becomes fuel off-gas and is supplied to the separation chamber 43 through the fuel off-gas outlet 14 of the end plate 12 and the outlet hole 25c of the second attachment base 25 shown in FIG. 13. In the separation chamber 43, fuel gas is separated from the fuel off-gas. The separated fuel gas is supplied to the fuel gas supply pipe 24 through the pipe 46 by the pump 45 shown in FIG. 4, so as to be reused. The fuel off-gas, from which most of fuel gas has been separated in the separation chamber 43, is introduced into the dilution chamber 49 of the diluter 48 through the fuel off-gas outlet 47 shown in FIG. 8. While the fuel off-gas flows in the dilution chamber 49 along the meandering plates 50, hydrogen gas contained in the fuel off-gas is diluted. The diluted fuel-off gas flows into the second oxidation off-gas discharge passage 33a of the second oxidation off-gas discharge pipe 33 from the communication hole 51. The fuel off-gas is further diluted with oxidation off-gas flowing through the second oxidation off-gas discharge passage 33a, and is then discharged to the outside from the second oxidation off-gas discharge pipe 33.

In the cooling jacket in the fuel cell stack 11, the coolant that has been used for reducing the heat caused by the generation of electricity is discharged into the coolant discharge passage 34a in the coolant discharge pipe 34, through the coolant outlet 18 of the end plate 12 and the outlet hole 23c of the attachment base 23 shown in FIG. 6. The coolant is again drawn to the heat exchanger by a circulation pump (not shown). After being cooled by the heat exchanger, the coolant is supplied to the coolant supply passage 27a of the coolant supply pipe 27.

The advantages of the above described fuel cell system will now be described.

(1) As shown in FIG. 7, the oxidation gas supply pipe 26 and the coolant supply pipe 27 are integrated, and the oxidation gas supply passage 26a and the coolant supply passage 27a are separated from each other by the single partition wall 28. This structure allows air in the oxidation gas supply passage 26a, which air has been heated through adiabatic compression by the compressor, to be effectively cooled by the low temperature coolant flowing through the coolant supply passage 27a. This improves the power generation efficiency in the fuel cell stack 11. Further, since there is no clearance between the oxidation gas supply pipe 26 and the coolant supply pipe 27, the installation space for the pipes 26, 27 is reduced. This reduces the weight and size of the second piping unit 22.

(2) As shown in FIG. 6, the first oxidation off-gas discharge pipe 31 and the coolant discharge pipe 34 are integrated, and the oxidation off-gas discharge passage 31a and the coolant discharge passage 34a are separated from each other by the single partition wall 35. This structure reduces the installation space of the first oxidation off-gas discharge pipe 31 and the coolant discharge pipe 34, thereby reducing the weight and size of the first piping unit 21.

(3) As shown in FIG. 8, the oxidation gas supply pipe 26, the second oxidation off-gas discharge pipe 33, and the diluter 48 are integrated, the oxidation gas supply passage 26a and the dilution chamber 49 are separated from each other by the single partition wall 52, and the second oxidation off-gas discharge passage 33a and the dilution chamber 49 are separated from each other by the single partition wall 53. This structure reduces the installation space of the oxidation gas supply pipe 26, the second oxidation off-gas discharge pipe 33, and the diluter 48, thereby reducing the weight and size of the oxidation gas supply pipe 26, the second oxidation off-gas discharge pipe 33, and the diluter 48.

The above described embodiment may be modified as follows.

Figure 14:
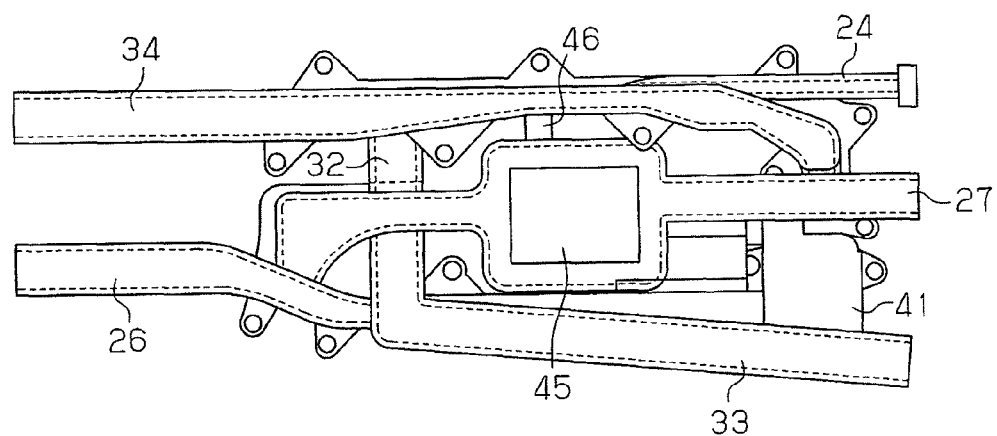
FIG. 14 is an enlarged front view illustrating a fuel cell system according to another embodiment of the present invention.

As shown in FIG. 14, the housing of the pump 45 may be surrounded by the coolant supply pipe 27, so that the outer circumferential surface of the coolant supply pipe 27 contacts the outer surface of the housing of the pump 45. This allows the pump 45 to be cooled by coolant flowing through the coolant supply passage 27a. Cooling of the pump 45 cools hydrogen gas supplied from the pipe 46 to the fuel gas supply pipe 24 by the pump 45 to an appropriate temperature. The power generation efficiency is thus improved.

The first piping unit 21 and the second piping unit 22 may be formed integrally.

The invention claimed is:
1. A fuel cell system, comprising:
 a fuel cell having a main body and an end plate, the end plate disposed on an end face of the main body;
  the end plate including:
   a fuel gas inlet and a fuel off-gas outlet,
   an oxidation gas inlet and an oxidation off-gas outlet, and
   a coolant inlet and a coolant outlet;
 a fuel gas supply pipe connected to the fuel gas inlet;
 a fuel off-gas pipe connected to the fuel off-gas outlet;
 an oxidation gas supply pipe connected to the oxidation gas inlet;
 an oxidation off-gas pipe connected to the oxidation off-gas outlet;
 a coolant supply pipe connected to the coolant inlet; and
 a coolant discharge pipe connected to the coolant outlet,
  the oxidation gas supply pipe having an oxidation gas passage, and the coolant supply pipe having a coolant supply passage,
 wherein the oxidation gas supply pipe and the coolant supply pipe are integrated, and the oxidation gas passage is separated from the coolant supply passage by a single supply pipe partition wall,
 wherein the oxidation gas inlet is formed in the end plate so as to be positioned between the coolant inlet and the fuel off-gas outlet with respect to a direction extending between opposing sides of the end plate, and wherein the fuel off-gas outlet, the oxidation gas inlet, the coolant inlet, and the fuel gas inlet are provided sequentially in a peripheral direction of the end plate.

2. The fuel cell system according to claim 1, further comprising a longitudinal axis of the coolant inlet and a longitudinal axis of the coolant outlet extending parallel to each other on the opposing sides of the end plate.

3. The fuel cell system according to claim 1, wherein the oxidation off-gas pipe has an oxidation off-gas passage, and the coolant discharge pipe has a coolant discharge passage, and
wherein the oxidation off-gas pipe and the coolant discharge pipe are integrated, and the oxidation off-gas passage is separated from the coolant discharge passage by a single discharge pipe partition wall.

4. The fuel cell system according to claim 1, further comprising a separator for separating fuel gas from fuel off-gas, wherein
the separator is provided in the fuel off-gas pipe and configured to conduct fuel gas that has been separated by the separator to the fuel gas supply pipe via a pump and a pipe,
the separator has a diluter for diluting fuel gas contained in the fuel off-gas discharged from the separator,
diluter is integrated with the oxidation off-gas pipe, and
a dilution chamber of the diluter is separated from an oxidation off-gas passage of the oxidation off-gas pipe by a single passage partition wall.

5. The fuel cell system according to claim 4, wherein the coolant supply pipe contacts the pump.

6. The fuel cell system according to claim 4, wherein the oxidation off-gas pipe includes a first oxidation off-gas pipe and a second oxidation off-gas pipe, the system further comprising:
a first attachment base to which the fuel gas supply pipe, the first oxidation off-gas pipe, and the coolant discharge pipe are integrally coupled as a first piping unit;
a second attachment base to which the oxidation gas supply pipe, the coolant supply pipe, the second oxidation off-gas pipe, the separator, and the diluter are integrally coupled as a second piping unit; and
a joint for coupling the first oxidation off-gas pipe to the second oxidation off-gas pipe.

* * * * *